United States Patent
Bicakci-Jenkins et al.

(10) Patent No.: US 6,841,212 B2
(45) Date of Patent: Jan. 11, 2005

(54) HEAT-RECOVERABLE COMPOSITION AND ARTICLE

(75) Inventors: Sirarpi Bicakci-Jenkins, San Marcos, CA (US); Abboud L. Mamish, Chula Vista, CA (US)

(73) Assignee: Tyco Electronics Corp.

( * ) Notice: Subject to any disclaimer, the term of this patent is extended or adjusted under 35 U.S.C. 154(b) by 0 days.

(21) Appl. No.: 10/124,529

(22) Filed: Apr. 17, 2002

(65) Prior Publication Data

US 2003/0198763 A1 Oct. 23, 2003

(51) Int. Cl.[7] .............................. B65B 53/02; F16L 9/14; C08L 23/16; C08L 51/06; B32B 7/12
(52) U.S. Cl. .................... 428/34.9; 428/35.8; 428/35.9; 428/36.9; 428/36.91; 428/346; 428/349; 138/141; 138/145; 524/384; 524/477; 524/476; 524/504; 524/523
(58) Field of Search ............... 428/34.9, 35.8, 428/35.9, 36.9, 36.91, 346, 349; 138/141, 145; 524/384, 476, 477, 504, 523

(56) References Cited

U.S. PATENT DOCUMENTS

| | | | |
|---|---|---|---|
| 4,284,541 A | * 8/1981 | Takeda et al. ............... 524/272 |
| 4,455,204 A | 6/1984 | Pieslak et al. ............... 204/147 |
| 4,732,632 A | 3/1988 | Pieslak et al. ................ 156/86 |
| 4,961,797 A | 10/1990 | Doheny ........................ 156/85 |
| 4,961,978 A | 10/1990 | Doheny, Jr. et al. .......... 428/40 |
| 5,264,476 A | * 11/1993 | Daimon et al. ............. 524/271 |
| 5,470,622 A | 11/1995 | Rinde et al. ................ 428/34.9 |
| 5,705,565 A | * 1/1998 | Hughes et al. ................ 525/65 |
| 5,763,516 A | * 6/1998 | Godfrey ..................... 524/271 |
| 5,849,824 A | * 12/1998 | Mercer et al. .............. 524/297 |
| 6,451,912 B1 | * 9/2002 | Kelch .......................... 525/66 |

FOREIGN PATENT DOCUMENTS

| | | |
|---|---|---|
| GB | 2 093 760 A | 9/1982 |
| JP | 08 208915 A | 8/1996 |
| WO | WO 01 55275 A | 8/2001 |

* cited by examiner

Primary Examiner—Harold Pyon
Assistant Examiner—Chris Bruenjes

(57) ABSTRACT

Disclosed is an adhesive composition suitable for bonding to a polymeric material and steel. The composition comprises specified proportions of a maleic anhydride-modified propylene-ethylene copolymer resin, a maleic anhydride-modified polyethylene, a polyisobutylene, a terpolymer comprising ethylene, propylene and a non-conjugated diene, and a hydrocarbon resin tackifier. The composition is useful in preparing a heat-recoverable article that is used to provide a protective coating on the joints of a steel pipeline. Also provided is a single sleeve or two-sleeve system for application to the joints of a coated steel pipeline operating at temperatures up to 120° C.

15 Claims, No Drawings

HEAT-RECOVERABLE COMPOSITION AND ARTICLE

FIELD OF THE INVENTION

This invention relates to dimensionally recoverable articles, particularly heat-recoverable articles, and to an adhesive suitable for use with such articles.

BACKGROUND OF THE INVENTION

Pipelines composed of steel pipe are commonly used to transport a variety of liquids and gases. Depending on the application and the environment, the pipe may be used above the ground or it may be buried. In order to protect the pipe from abrasion, corrosion, and degradation due to exposure to sun, soil, moisture, and other elements, it is often necessary to coat the exterior of the pipe with a protective layer. The nature of this protective layer depends on the environment to which the pipe is exposed, but, for many applications, the protective layer is polymeric. The protective layer may comprise a polymer based tape which is coated with an adhesive layer and is then applied to the pipe, or it may comprise an epoxy which is electrostatically sprayed or painted onto the pipe. Another type of effective coating is a fusion bonded epoxy coating in which the epoxy powder is sprayed onto the pipe and is then cured to form a pinhole-free layer which is suitable for use up to about 60° C. Frequently the protective coating comprises a number of layers, for example an epoxy layer, which is immediately adjacent the pipe and an outer polymer layer such as polyethylene. Such coatings provide the advantages of the epoxy and the polymer and are useful up to a temperature of about 110° C.

Several manufacturers have introduced coated steel pipe, which is designed to withstand exposure temperatures of up to 110° C. Such pipe generally has a coating, which comprises an inner layer of fusion bonded epoxy, an optional adhesive layer, and an outer layer of polypropylene. These layers provide excellent protection to the steel pipe because they combine the excellent adhesion and cathodic disbanding resistance of the epoxy with the low moisture absorption, low moisture transmission, and abrasion resistance of polypropylene. The difficulty with such pipe is that there are currently no easily installable coatings for the pipe joints or welds that are created when pipe is repaired or retrofitted, for example, when two pieces of pipe are attached to one another. Therefore, when a joint or a weld must be made to the polypropylene-coated pipe, difficult and time-consuming procedures must be followed to ensure that the pipe joint or weld is adequately protected. For example, one technique requires preheating the weld region to about 240° C. by induction heating, then applying a layer of fusion bonded epoxy powder followed by a layer of polypropylene. To ensure adequate adhesion, the polypropylene sheet is heated with a torch and smoothed out with a spatula. The procedure, which requires a skilled craftsman, is especially difficult to carry out in the field where the conditions are not easily controlled.

One technique for supplying a protective coating layer to a pipe joint or weld in the field is by the use of a heat-recoverable polymeric article, that is, a heat-shrinkable polymeric article such as a sleeve, sheet, or tape, in combination with a heat-activatable sealant. The polymeric material of the article has been crosslinked during the production process so as to enhance the desired dimensional recovery. One method of producing a heat-recoverable article comprises shaping the polymeric material into the desired heat-stable form, subsequently crosslinking the polymeric material, heating the article to a temperature above the crystalline melting point of the polymer (or, for amorphous materials, the softening point of the polymer), deforming the article, and cooling the article while in the deformed state so that the deformed state of the article is retained. In use, because the deformed state of the article is heat-unstable, application of heat, by means of a torch or other heat source, will cause the article to assume its original heat-stable shape. For many applications, the article is designed to shrink down onto the substrate.

To enhance adhesion to the substrate, such heat-recoverable articles generally comprise a layer of a heat-activatable sealant which is positioned adjacent the substrate. When the article is heated, the temperature of the heat-activatable sealant rises above its activation temperature so that a strong bond is formed between the polymeric article and the substrate. Suitable sealants include pressure sensitive adhesives, hot melt adhesives and mastics. Good adhesion of the coating to the substrate is particularly important to avoid cathodic disbonding. Cathodic disbanding occurs as a result of the impressed electric current that is applied to the pipe to prevent corrosion of the iron in the steel pipe. Many adhesive compositions. which are used to bond a protective coating onto a pipe. are adversely affected by the impressed electric current. As a result, the bond weakens and the adhesive disbonds from the pipe, leaving segments of the pipe surface exposed to the corrosive conditions of the environment.

For pipe protection, conventional heat-recoverable articles are sleeves which comprise a backing layer, generally polyethylene or a copolymer comprising ethylene, in contact with a hot melt adhesive, which is often a polyethylene-based adhesive. The hot melt adhesive is selected to have adequate adhesion both to the backing layer and to the substrate. Most conventional polyethylene-based heat-recoverable sleeves do not adhere well to a polypropylene-coated pipe, and those sleeves which do have good adhesion cannot be used for pipelines which are exposed to high temperatures, for example more than 110° C., because they contain adhesives or mastics which soften and disbond from the pipe under soil stress and at high temperatures. Although there are a number of commercial polypropylenes and modified polypropylenes which can be used in adhesives which stick well to polypropylene-coated pipes, these materials do not have good adhesion to polyethylene backing layers. Furthermore, because polypropylene degrades when crosslinked by means of electron beam irradiation, a heat-recoverable sleeve comprising a polypropylene backing layer is not practical.

In general, as mentioned, steel pipes are coated with polymeric materials to prevent the steel from corrosion and to provide mechanical protection. Polypropylene coatings are desirable as a result of high temperature resistance, low moisture absorption, good abrasion resistance and exceptional resistance to mechanical damage. The polypropylene line coatings are available in two main forms, namely, three-layer polypropylene and foamed polypropylene. The three-layer polypropylene comprises an epoxy corrosion protection layer, a polypropylene copolymer tie-layer, and an outer polypropylene mechanical protection layer. The foamed polypropylene has the same sequence of layers as the three-layer polypropylene line coating, with the insertion of a foamed polypropylene between the polypropylene copolymer tie-layer and the outer polypropylene mechanical protection layer.

The polypropylene line coatings are applied in specialized coating factories. At the ends of the steel pipes, the coatings are cut back over a length of 150 mm±20 mm. Thereafter, the pipes are welded together in the field, leaving a portion of the steel pipe exposed. It is necessary to protect the exposed steel against corrosion.

It has been found that providing a field joint coating process that will bond well with the polypropylene coating applied at the factory is difficult. There are available proposed solutions to the problem, such as injected polypropylene, sprayed polypropylene, injected polyurethane, welded polypropylene and heat shrink sleeves. However, these techniques do not provide an easy, fast and inexpensive solution for the grit-weld joint of polypropylene coated pipelines. It would, therefore, be desirable to provide an easily installable heat-shrinkable sleeve that will be suitable for use at operating temperatures up to about 120° C.

SUMMARY OF THE INVENTION

A heat-recoverable article which has good adhesion to steel polyethylene, and polypropylene, has good cathodic disbonding resistance, and is suitable for use at temperatures up to 120° C. can be made. In a first aspect, this invention provides an adhesive composition suitable for sealing to a substrate which comprises polypropylene, polyethylene or steel, said composition comprising:

a) An amount of from about 20 to about 60% by weight of a maleic anhydride-modified propylene-ethylene copolymer resin;

b) An amount of from about 15 to about 40% by weight of a maleic anhydride-modified polyethylene;

c) An amount of from about 5 to about 20% by weight of a polyisobutylene;

d) An amount of from about 5 to about 20% by weight of a terpolymer comprising ethylene, propylene and a non-conjugated diene; and e) An amount of from about 10 to about 30% by weight of an inert thermoplastic hydrocarbon resin tackifier formulated from a mixture of aromatic and aliphatic feedstocks.

In a second aspect, this invention provides a heat-recoverable article comprising a heat-recoverable polymeric element, said element having coated on at least a part of a surface thereof an adhesive composition preferably according to the first aspect of the invention.

In a third aspect, this invention provides an assembly which comprises:

(1) a substrate which comprises polypropylene, polyethylene, or steel; and (2) an adhesive preferably according to the first aspect of the invention which is in contact with and seals to the substrate.

DETAILED DESCRIPTION OF THE INVENTION

The adhesive composition of the invention is particularly useful in adhering to polypropylene, steel, polyethylene, and/or fusion bonded epoxy. The adhesives of the invention exhibit adhesive character at elevated temperature, e.g. 110° C. or 120° C. The disclosure of ASTM Test Method D-1000 is incorporated by reference. The polypropylene or polyethylene, to which the adhesive composition adheres may be a film, sheet, or article of polypropylene or polyethylene which has sufficient thickness and integrity to stand alone, or it may be in the form of a coating over a part or all of a substrate such as a pipe. The compositions of the invention are particularly useful in adhering to polypropylene-coated steel pipe, or to polyethylene-coated steel pipe.

The adhesive composition of the present invention comprises:

a) An amount of from about 20 to about 60% by weight of a maleic anhydride-modified propylene-ethylene copolymer resin;

b) An amount of from about 15 to about 40% by weight of a maleic anhydride-modified polyethylene;

c) An amount of from about 5 to about 20% by weight of a polyisobutylene;

d) An amount of from about 5 to about 20% by weight of a terpolymer comprising ethylene, propylene and a non-conjugated diene; and e) An amount of from about 10 to about 30% by weight of an inert thermoplastic hydrocarbon resin tackifier formulated from a mixture of aromatic and aliphatic feedstocks.

In more detail, any maleic anhydride-modified propylene-ethylene copolymer resin may be used as a component of the adhesive composition. A suitable resin, commercially available from Rohm and Haas Company, is TYMOR 2216 maleic anhydride-modified propylene-ethylene copolymer resin having a melt index of 4.5 g/10 min., a density of 0.9 g/cm$^3$, and a melt point of 143° C. Another exemplary material, commercially available from Atofina, is OREVAC 18707 resin.

Further, any maleic anhydride-modified polyethylene resin may be used as a component of the adhesive composition. A suitable exemplary material, commercially available from DuPont, is BYNEL 4109 maleic anhydride-modified linear low density polyethylene resin, having a melt index of 3.1 g/10 min., a density of 0.92 g/cm$^3$, a melt point of 126° C., and a Vicat Softening Point of 87° C. Another exemplary material, commercially available from Equistar, is PLEXAR 213B maleic anhydride-modified high density polyethylene resin.

In the adhesive composition, there may be used any polyisobutylene. A suitable material, commercially available from Exxon Mobil, is VISTANEX MM-L-80 polyisobutylene having a specific gravity of 0.92, an ash of 0.3 weight % maximum and a volatiles content of 0.3 weight % maximum.

Any terpolymer comprising ethylene, propylene and a non-conjugated diene may be used in the present adhesive compositions. A particularly suitable example, commercially available from Exxon Mobil, is VISTALON 2504 terpolymer of ethylene, propylene, and a non-conjugated diene having 3.4 weight % ethylidene norbornene, and an ethylene content of 70 weight %.

Any inert thermoplastic hydrocarbon resin formulated from a mixture of aromatic and aliphatic feedstocks may be used as a tackifier in preparing the adhesive compositions of the present invention. A suitable example, commercially available from Neville Chemicals, is NEVPENE 9500 hydrocarbon resin having a Ring and Ball Softening Point of 100° C., a Gardner Color (50% in 100 Solvent) of 9, a Specific Gravity at 25° C. of 1.05, an Iodine Number of 150, a Flash Point of 430° F., and a Number Average Molecular Weight (GPC) of 650.

The adhesive compositions can contain other conventional additives such as fillers, waxes, rubbers, stabilizers and the like, as desired.

The components of the adhesive composition can be mixed in any convenient manner, for example by using conventional mixing equipment such as Brabender or Banbury mixers, extruders, or mills. Following mixing, the composition can be shaped appropriately for the desired use. For example, the composition can be formed into a sheet, for example, by extrusion, which can be wrapped or arranged around a substrate, or the composition can be coated onto a backing layer, for example, by extrusion, calendaring, or other type of coating application.

The adhesive compositions of the invention can be used for any application. In one particular application, the adhesive is used as part of a heat-recoverable article, which is used to provide a covering on a pipe. A heat-recoverable article is an article, the dimensional configuration of which may be changed by subjecting the article to heat treatment. In the most common form, such articles comprise a heat-shrinkable sleeve made from a polymeric material exhibiting the property of elastic or plastic memory. Alternatively, heat-recoverable articles can be molded into shapes intended for specific applications.

Conventional heat-recoverable sleeves used to provide a protective coating to pipes have either a tubular elongate configuration or a flat configuration. Where the diameter of the pipe or other substrate is very large, thus making extrusion of a sufficiently large tubular sleeve difficult, or where no free end of the substrate is available, thus preventing positioning of a tubular sleeve, it is common to use a wrap-around article. A wrap-around article is an article, typically in the form of a sheet, that is installed by wrapping it around the object to be covered so that opposed longitudinal edges overlap. A closure means is applied to secure together the opposed longitudinal edges.

The adhesive of the invention is suitable for use in making a bond between a polypropylene-coated steel pipe and a polyethylene-based heat-recoverable sleeve. The adhesive can be applied to the sleeve prior to installation on the pipe or other substrate, it can be applied directly to the pipe or other substrate prior to installation of the sleeve, for example, as a coating applied in the factory, or it can be used in the form of a sheet which is inserted between the pipe or other substrate and the heat-recoverable sleeve. In any case, the heat-recoverable sleeve may have one or more coating layers which are applied before the adhesive of the invention. It is not necessary that the adhesive composition cover an entire surface of the heat-recoverable sleeve; often strips of adhesive at the edges of the sleeve or wraparound article are sufficient to make adequate connection to the substrate. When adhesives of the invention are used with heat-recoverable articles, if there is an adhesive failure, the preferred failure mechanism is between the adhesive and the backing, that is, the heat-recoverable article, rather than between the adhesive and the substrate, for example, the polypropylene-coated pipe.

Adhesives of the invention have good performance for cathodic disbondment at elevated temperature, for example at 120° C., when tested according to ASTM G-42. In addition to the good cathodic disbondment performance, the adhesive retains its adhesive character at the elevated temperature.

The adhesive of the invention is also useful as part of an assembly in which a substrate which comprises polypropylene is in contact with the adhesive. The polypropylene of the substrate may comprise all or part of a surface coating of the substrate, for example, a pipe, or the entire substrate may be made of polypropylene, for example, a molded part or component. For many applications it is preferred that the polypropylene of the substrate be in the form of a layer which surrounds the substrate.

The adhesive of the invention may also be used as part of a method for making a connection between a layer or an article which comprises polypropylene, for example, a polypropylene-coated pipe, and a layer or an article which comprises polyethylene, for example, a polyethylene-containing backing layer of a heat-recoverable article. In such a method, the adhesive layer is positioned in contact with the substrate which comprises polypropylene, heat is applied to allow the adhesive to melt and flow while in contact with the substrate, and the adhesive is then allowed to cool, producing a bond between the adhesive (and any backing or carrier to which it is attached) and the substrate.

In other words, when in the form of a sheet or tape, the heat recoverable article is generally coated with the adhesive composition of the present invention, and the sheet or tape is placed on the substrate to be protected, with the adhesive coated surface placed in contact with the substrate. The sheet or tape is preferably heat-shrinkable and is wrapped around the pipe. Heat causes the sheet or tape to shrink into contact with the pipe. The substrate can be any metal substrate to be protected from corrosion, but generally the heat recoverable article is used to protect iron or steel pipe.

When the heat-recoverable article is heat-shrinkable and in the form of a sleeve, it is coated with adhesive on the interior surface thereof. The sleeve can be continuous tubular member or a sheet adapted to form a tube when wrapped around a substrate. The sleeve is positioned around the pipe and heated to shrink the sleeve onto the pipe and melt or activate the adhesive to bond the sleeve to the pipe. Heat-recoverable sleeves of this type are well known in the art.

The protective coating or covering applied to the metal substrate is preferably a polyolefin such as polyethylene or polypropylene. Other polymers such as polyvinyl chloride and polymeric blends can also be used. Particularly preferred is cross-linked polyethylene.

In an embodiment of the present invention for providing a field applied, heat shrink, anti-corrosion sleeve for the joints of a polypropylene-coated steel pipeline, there may be utilized a single sleeve designated as Design 1 herein. The single sleeve will comprise a backing of a cross-linked polyethylene having any desired thickness, preferably about 30 mils, and an adhesive layer on the backing having any desired thickness, preferably about 40 mils. The adhesive layer is the adhesive composition of this invention and provides for the bonding to the polypropylene coating and to the steel of the pipeline.

In another embodiment of the present invention, there was provided a field applied, heat shrink, anticorrosion sleeve for the joints of a polypropylene coated steel pipeline, wherein the sleeve is a two-sleeve system, designated herein as Design 2. In this two-sleeve design, there is an inner sleeve comprising a backing of a cross linked polyethylene having any desired thickness, preferably about 15 mils, and an adhesive layer on the inner sleeve, the adhesive layer having any desired thickness, preferably about 20 mils. The adhesive layer of the inner sleeve is the adhesive composition of the invention. The inner sleeve is applied to both the polypropylene coating of the polypropylene-coated steel pipeline and to the uncoated, exposed steel portion of the pipeline, or in other words, to the entire joint of the pipeline.

In the two-sleeve system, designated as Design 2, there is also provided a second, or the outer, sleeve. The outer sleeve of this system comprises a backing of a cross-linked polyethylene having any desired thickness, preferably about 30 mils, and an adhesive layer on the outer sleeve, the adhesive layer preferably having a thickness of about 20 mils. The adhesive layer of the outer sleeve comprises OREVAC 18380 hot melt adhesive, commercially available from Atofina. The OREVAC 18380 adhesive is a blend of linear low-density polyethylene and very low-density polyethylene with comonomer of butene and octane, and grafted with maleic anhydride. The OREVAC 18380 hot melt adhesive is further characterized by having a melt index of 4 g/10 min., a melting point of 120° C., a VICAT softening point of 83° C, and a density of 0.911 g/cm$^3$. The outer sleeve of the two-sleeve system is applied to the backing of the inner sleeve. Bonding of the inner sleeve to the entire joint of the pipeline is caused by the adhesive composition of the inner sleeve. Bonding of the outer sleeve to the inner sleeve is caused by the adhesive of the outer layer.

In a preferred embodiment of the present invention, there was provided a field applied, heat shrink, anti-corrosion sleeve for the joints of a polypropylene coated steel pipeline, wherein the sleeve is a two-sleeve system designated as Design 3. The two-sleeve system comprises two strips of sleeves, designated the inner sleeves, each comprising a backing preferably of a cross-linked polyethylene having any desired thickness, preferably about 15 mils, and an adhesive layer on each inner sleeve, said adhesive layers each having any desired thickness preferably about 30 mils. The adhesive layer of the two inner sleeves is any desired adhesive, preferably the adhesive composition of the invention. Furthermore, the two inner sleeves were applied at least to the polypropylene coating of the polypropylene-coated steel pipeline, preferably close to the point where the exposed steel portion of the pipeline appears, and on both sides of the exposed steel portion. In other words, one of the inner sleeves was applied to the polypropylene-coated steel pipeline on one side of the exposed, uncoated steel portion of the pipeline; and the second of the two inner sleeves was applied to the polypropylene-coated steel pipeline on the other side of the exposed, uncoated steel portion of the pipeline. The adhesive composition provides the bonding of the inner layers to the polypropylene coating of the pipeline.

The two-sleeve system designated as Design 3 comprises, in addition to the two inner sleeves, another sleeve, designated the outer sleeve. The outer sleeve of the two-sleeve system comprises a backing preferably of a cross-linked polyethylene having any desired thickness, preferably about 30 mils, and an adhesive layer on the outer sleeve, said adhesive layer having a thickness of preferably about 40 mils. Any adhesive may be used, preferably the adhesive composition of Example 1. The outer sleeve of the two-sleeve system was applied over the two inner sleeves, and over the exposed, uncoated steel portion of the pipeline, thereby covering the entire joint, and bonding to both the polypropylene backing of the inner sleeves, and the steel of the pipeline. Bonding is caused by the adhesive composition.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way. Moreover, all U.S. patents referred to herein are incorporated by reference in their entirety.

EXAMPLES

In the following examples, the test procedures listed below were used in evaluating the properties of the materials and the adhesive compositions herein.

| | |
|---|---|
| Melt index | ASTM D1238 |
| Density | ASTM D792 |
| Melt Point | ASTM D3418, DSC |
| VICAT Softening Point | ASTM D1525 |
| Ring Ball Softening Point | ASTM E-28 |
| Gardner Color | ASTM D-1544 |
| Specific Gravity | ASTM D-71 |
| Iodine Number | ASTM D-1959 |
| Flash Point | ASTM D-92 |
| Number Average Molecular Weight, GPC | ASTM D-3536 |
| Lap Shear Strength | EN 12068 |
| Lap Shear Strength | ASTM D-1002 |
| Resistance of Adhesion to Cathodic Disbonding | ASTM G-42-75, method A, under conditions of 30 days at 120° C. |
| Peel to Steel Strength | ASTM D-1000, under conditions of 23° C. and 2 inches/min, and 120° C. and 2 inches/min. |
| Peel to Pipe Coating Strength | EN12068-C, under conditions of 23° C. and 10 mm/min., and 120° C. and 10 mm/min. |

Example 1

Preparation of Adhesive Composition

An adhesive composition was prepared as follows, comprising the following components, utilizing a Banbury mixer followed by a twin screw extruder.

A masterbatch is prepared in a F80 Banbury mixer comprising the following components:

(a) 28 weight % of VISTANEX MM-L-80 polyisobutylene;

(b) 20 weight % of VISTALON 2504 ethylene, propylene, and non-conjugated diene terpolymer;

(c) 44 weight % of BYNEL 4109 maleic anhydride-modified linear low-density polyethylene resin;

(d) 2 weight % of pentaerythritol tetrakis [3-(3,5-di-tert-butyl-4-hydroxyphenyl) propionate]; and (e) 6 weight % of DHDA 7704 black color concentrate comprising an ethylene-ethyl acrylate copolymer having 18.5 to 20 weight % ethyl acrylate and containing 37 weight % N-351 carbon black.

The above listed masterbatch of components (a) through (e) was mixed in a F80 Banbury mixer for 3 minutes, and the resulting mixed masterbatch was dumped in a short single screw extruder where pellets were formed.

Thereafter, in completing the preparation of the adhesive composition, a composition comprising 50 weight % of the resulting masterbatch pellets; 15 weight % of NEVPENE 9500 inert thermoplastic hydrocarbon resin tackifier; and 35 weight % of TYMOR 2216 maleic anhydride-modified propylene-ethylene copolymer, was mixed in an intermashing, co-rotating twin screw extruder (model ZSK83). In carrying out the mixing of the composition, in the twin screw extruder, the masterbatch pellets and the TYMOR 2216 maleic anhydride-modified propylene-ethylene copolymer, were fed to the hopper of the twin screw extruder from separate feeders. The NEVPENE 9500 inert thermoplastic hydrocarbon resin tackifier was fed to the barrel of the twin screw extruder through a side feeder. There was thus obtained the adhesive composition of Example 1. The properties of the adhesive composition are reported in Table 1.

Example 2
Preparation of a Single Sleeve Design 1

In this example, there is shown the preparation of a heat shrink, anti-corrosion single sleeve to be applied to the joints of a polypropylene-coated steel pipeline, operating at temperatures ranging up to 120° C. The single sleeve is prepared by a lamination process.

The adhesive composition of Example 1is melted, and pumped through a single screw extruder, forced through a sheeting die and coated onto pre-heated cross-linked polyethylene backing having a thickness of about 30 mils.

At the exit of the sheeting die, the molten adhesive composition is pressed against the pre-heated backing, between two heated rolls, and lamination is achieved. In this manner, there is produced a single sleeve comprising a backing of a cross-linked polyethylene having a thickness of about 30 mils, and laminated thereto, a layer of the adhesive composition of Example 1, having a thickness of about 40 mils.

It is expected that the laminated single sleeve will be a suitable field applied, heat shrink, anti-corrosion sleeve for the joints of polypropylene-coated steel pipelines operating at temperatures of up to 120° C. The properties of Design 1 single sleeve are reported in Table 2.

Example 3
Preparation of Two-sleeve, Design 2

In this example, there is shown the preparation of a heat shrink, anti-corrosion two-sleeve system, designated as Design 2, to be applied to the joints of a polypropylene-coated steel pipeline, operating at temperatures ranging up to 120° C. In this system there are an inner sleeve and an outer sleeve, both comprised of a backing and an adhesive, prepared by a lamination process.

The adhesive for each of the sleeves is melted, and the melt is pumped through a single screw extruder and forced through a sheeting die. A backing of a cross-linked polyethylene having the required thickness is pre-heated. At the exit of the sheeting die, the molten adhesive is pressed against the pre-heated backing, between two heated rolls, and lamination is achieved.

In more detail, in this two-sleeve system, the following is carried out. An inner sleeve is produced having a backing of cross-linked polyethylene having a thickness of about 15 mils, and an adhesive layer having a thickness of about 20 mils, bonded to the backing. The adhesive of the inner sleeve is the adhesive composition of Example 1. The inner sleeve is to be applied adhesively to both the polypropylene coating of the pipeline and to the exposed, uncoated steel of the pipeline.

The outer sleeve of the two-sleeve system of this Design 2, is produced having a backing of cross-linked polyethylene having a thickness of about 30 mils, and an adhesive layer having a thickness of about 20 mils, bonded to the backing. The adhesive of the outer sleeve is the OREVAC 18380 hot melt adhesive described herein. The outer sleeve is to be adhesively applied on top of the backing of the inner sleeve.

The inner sleeve is adhesively secured to both the polypropylene coating, and to the exposed steel of the pipeline, by means of the adhesive. The outer layer is adhesively secured to the backing of the inner sleeve, by means of the adhesive. The properties of Design 2 two-sleeve are reported in Table 2.

Example 4
Preparation of Two-Sleeve Design 3

In this example, there is shown the preparation of a two-sleeve system designated as Design 3 suitable for use as a field applied, heat shrink, anti-corrosion sleeve for the joints of polypropylene-coated steel pipelines operating at temperatures up to 120° C. The two sleeves of the two-sleeve system are prepared by a lamination process. The two-sleeve system comprises 2 strips of inner sleeves, each having a backing of 15 mils thickness and an adhesive layer bonded to the backing, the adhesive layer having a 30 mils thickness, each of the two inner sleeves to be adhesively applied on the polypropylene-coated portion of the pipeline, and on each side of the exposed, uncoated steel pipe portion of the pipeline. The second sleeve of the two-sleeve system is an outer sleeve that is to be adhesively applied over the two inner sleeves, and over the exposed, uncoated steel pipe portion of the pipeline. In effect, the second, or outer, sleeve of the two-sleeve system, is to be applied over the entire joint of the polypropylene coated steel pipeline.

In preparing the two sleeves of the inner sleeve, and the outer sleeve, of the two-sleeve system of this example, the following process was followed. The only difference was the thickness of the backing layers and the layers of adhesive composition, of the two inner sleeves and the outer sleeve.

Accordingly, in preparing the inner and outer sleeves, the adhesive composition of Example 1 was melted and pumped through a single screw extruder, forced through a sheeting die and coated onto pre-heated cross-linked polyethylene backing.

At the exit of the sheeting die, the molten adhesive composition was pressed against each of the pre-heated backings, between two heated rolls, thereby achieving lamination of the adhesive composition to the backings. In this manner, there were produced two inner sleeves, each comprising a backing of a cross-linked polyethylene having a thickness of about 15 mils, and laminated thereto, a layer of the adhesive composition of Example 1, having a thickness of about 30 mils. Also produced in this manner was an outer sleeve comprising a backing of a cross-linked polyethylene having a thickness of about 30 mils, and laminated thereto, a layer of the adhesive composition of Example 1, having a thickness of about 40 mils.

In order to evaluate the performance of the two-sleeve system as a field applied, heat shrink anti-corrosion sleeve for the joints of a polypropylene-coated steel pipeline that operates at temperatures up to 120° C., the adhesive-coated backings were recovered onto the joint of a polypropylene-coated pipeline as follows.

Each of the two inner sleeves having the 15 mil backing and the layer of 30 mil thickness of adhesive composition herein, is adhesively applied entirely or mainly onto the polypropylene coating of the polypropylene-coated steel pipe, on each side of the exposed, uncoated steel portion of the pipeline and partially on the steel surface. Adhesion is achieved by contacting the adhesive layer of the inner sleeves with the polypropylene coating and partially with the steel surface, of the polypropylene-coated steel pipe.

Thereafter, the outer sleeve having the 30 mil backing and the layer of 40 mil thickness of adhesive composition herein, was adhesively applied onto the entire joint. This means that the adhesive composition layer of the outer sleeve contacted, and was adhesively secured, both to the polyethylene backings of the two inner sleeves that were secured to the polypropylene coating of the pipeline, and to the exposed, uncoated steel portion of the pipeline. The properties of Design 3 two-sleeve are reported in Table 2.

Adhesion Procedure

The adhesion of the adhesive composition to various substrates was then measured at approximately 23° C. and at 120° C. following the peel strength test procedure of ASTM D-1000, the disclosure of which is incorporated herein by reference. In that test, the adhesive-coated backing was recovered onto a pipe and was cut on the pipe into test specimens with a width of 25 mm (1 inch). Each specimen was cut parallel to the direction of the pipe to create a free end which was clamped in the jaw of an Instron tester. After allowing the sample to equilibrate to the desired temperature (either 23° C. or 120° C.) in the thermal chamber of the tester, the jaw separation speed of the Instron tester was set at 51 mm/minute (2 inches/minute). The amount of force required to peel the layer from the pipe was recorded as pounds/linear inch.

Cathodic Disbonding Test Procedure

The cathodic disbonding resistance of an adhesive can be tested by the test method found in ASTM G-42-75, method A.

The adhesive composition to be tested was pressed into slabs, 6"×6"×0.025", in a hot press between two "Teflon", polytetrafluoroethylene, coated plates.

The surface of a steel pipe, 12 inches long and 2 inches in diameter was grit blasted and degreased with solvent and preheated to 400°–425° F. with a torch. The sample adhesive slab, trimmed to 6"×4"×0.025", was placed on the preheated pipe and a heat-shrinkable sleeve of cross-linked polyethylene was placed over it and heated to shrink the sleeve over the adhesive and pipe. One end of the pipe was then sealed with a heat-shrinkable cap.

A hole (holiday) was drilled through the polyethylene coating and adhesive in the middle of the length of pipe to expose the metal surface of the pipe at that point. The pipe was then immersed in an electrolyte solution comprising water and one weight percent of each of sodium chloride, sodium sulfate, and sodium carbonate. A potential of −1.5 volts was applied to the pipe thus making the pipe a cathode in the electrolyte solution which also contains a sacrificial anode. The sample and electrolyte solution were maintained at a temperature of 120° C. for thirty days. The pipe was then removed and the area around the holiday inspected to determine the extent of disbandment. The approximate radius of the disbandment area surrounding the holiday was measured in millimeters (mm) and recorded.

TABLE 1

ADHESIVE of EXAMPLE 1

| Property | Test Method | Conditions | Value |
|---|---|---|---|
| Lap Shear Strength (psi) | ASTM D-1002 | 23° C., 2"/min | 360 |
| | | 120° C., 2"/min | 22 |
| Lap Shear Strength (N/cm$^2$) | EN 12068 | 23° C., 10 mm/min | 245 |
| | | 120° C., 10 mm/min | 9 |
| Melt Flow Index (g/10 min) | ASTM D-1238 | 190° C., 2.16 kg | 1.6 |

TABLE 2

INSTALLED SLEEVE

| Property | Test Method | Conditions | Design 1 | Design 2 | Design 3 |
|---|---|---|---|---|---|
| Peel to Steel (pli) | ASTM D-1000 | 23° C., 2"/min | 25[1] | 18[2] | 25[3] |
| | | 120° C., 2"/min | 7.4[1] | 2.5[2] | 7.4[3] |
| Peel to Steel (N/cm) | EN 12068 | 23° C., 10 mm/min | 19[1] | 13[2] | 19[3] |
| | | 120° C., 10 mm/min | 10[1] | 6.4[2] | 10[3] |
| Peel Strength to Polypropylene (N/cm) | EN 12068 | 23° C., 10 mm/min | 19[4] | 15[5] | 27[5] |
| | | 120° C., 10 mm/min | 11[4] | 4.6[5] | 11[5] |
| Resistance to Cathodic Disbondment (mm) | ASTM G-42 | 30 days @ 120° C. | 24 | 24 | 24 |
| Impact Resistance (J) | EN 12068 | 230° C. | 8 | 15 | 8 |
| Impact Resistance (lbs · in) | ASTM G-14 | 23° C. | 85 | 195 | 85 |

Notes:
[1] The reported peel value represents the peel strength between the backing and the adhesive. The actual peel values between the adhesive and the steel is actually much higher than the reported values.
[2] The reported peel value represents the peel strength between the backing of the inner sleeve and the adhesive of the inner sleeve. The actual peel values between the adhesive of the inner sleeve and the steel is actually much higher than the reported values.
[3] The reported peel value represents the peel strength between the backing of the outer sleeve and the adhesive of the outer sleeve. The actual peel values between the adhesive of the outer sleeve and the steel is actually much higher than the reported values.
[4] The reported peel value represents the peel strength between the backing and the adhesive. The actual peel values between the adhesive and polypropylene based line coating is actually much higher than the reported values.
[5] The reported peel value represents the peel strength between the backing of the inner sleeve and the adhesive of the inner sleeve. The actual peel values between the adhesive of the inner sleeve and the polypropylene based line coating is actually much higher than the reported values.

It should be clearly understood that the forms of the invention herein described are illustrative only and are not intended to limit the scope of the invention. The present invention includes all modifications falling within the scope of the following claims.

We claim:

1. An adhesive composition suitable for sealing to a substrate selected from the group consisting of polymeric materials and steel, said composition comprising
    (a) An amount of from about 20 to about 60% by weight of maleic anhydride-modified propylene-ethylene copolymer resin;
    (b) An amount of from about 15 to about 40% by weight of a maleic anhydride-modified polyethylene;
    (c) An amount of from about 5 to 20% by weight of a polyisobutylene;
    (d) An amount of from about 5 to 20% by weight of a terpolymer comprising ethylene, propylene and a non-conjugated diene; and
    (e) An amount of from about 10 to about 30% by weight of an inert thermoplastic hydrocarbon resin tackifier formulated from a mixture of aromatic and aliphatic feedstocks.

2. The adhesive composition according to claim 1 wherein the maleic anhydride-modified propylene-ethylene copolymer resin has a melt index of 4.5 g/10 min., a density of 0.9 g/cm$^3$, and a melt point of 143° C.; and wherein the maleic anhydride-modified polyethylene has a melt index of 3.1 g/10 min., a density of 0.92 g/cm$^3$, a melt point of 126° C., and a Vicat Softening Point of 87° C.

3. The adhesive composition according to claim 2, further comprising pentaerythritol tetrakis [3-(3,5-di-tert-butyl-4-hydroxyphenyl) proplonate], and a color concentrate comprising an ethylene-ethyl acrylate copolymer having 18.5 to 20 weight % ethyl acrylate and carbon black.

4. A heat-shrinkable article comprising a heat-shrinkable polymeric material having coated on at least a part of a surface thereof an adhesive composition according to claim 1.

5. The heat-shrinkable article according to claim 4 wherein the heat shrinkable polymeric material has coated thereon an adhesive composition comprising
   (a) An amount of from about 20 to about 60% by weight of a maleic anhydride-modified propylene-ethylene copolymer resin;
   (b) An amount of from about 15 to about 40% by weight of a maleic anhydride-modified polyethylene;
   (c) An amount of from about 5 to about 20% by weight of a polyisobutylene;
   (d) An amount of from about 5 to about 20% by weight of a terpolymer comprising ethylene, propylene and a non-conjugated diene; and
   (e) An amount of from about 10 to about 30% by weight of an inert thermoplastic hydrocarbon resin tackifier formulated from a mixture of aromatic and aliphatic feedstocks,
wherein
the maleic anhydride-modified propylene-ethylene copolymer resin has a melt index of 4.5 g/10 min., a density of 0.9 g/cm$^3$, and a melt point of 143° C.; and wherein the maleic anhydride-modified polyethylene has a melt index of 3.1 g/10 min., a density of 0.92 g/cm$^3$, a melt point of 126° C., and a Vicat Softening Point of 87° C., and wherein the adhesive composition further comprises pentaerythritol tetrakis [3-(3,5-di-tert-butyl-4-hydroxyphenyl) propionate], and a color concetrate comprising an ethylene-ethyl acrylate copolymer having 18.5 to 20 weight % ethyl acrylate and carbon black.

6. The heat-shrinkable article according to claim 4, wherein the article is a sleeve.

7. The heat-shrinkable article according to claim 4, wherein the heat shrinkable material is a polyethylene.

8. An assembly which comprises:
   (a) a substrate selected from the group consisting of polypropylene, polyethylene and steel; and
   (b) an adhesive composition according to claim 1 that is bonded to the substrate.

9. The assembly according to claim 8 wherein the substrate comprises a pipe.

10. An assembly comprising:
    (a) a substrate that is a steel pipe partially coated with a polypropylene;
    (b) at least one first layer bonded to at least the polypropylene coating of the polypropylene-coated steel pipe, said first layer comprising a first polymeric backing and a second layer thereon comprising a first adhesive composition according to claim 1, said second layer comprising the first adhesive composition bonded to the polypropylene coating; and
    (c) at least one third layer bonded to the first polymeric backing of the first layer and bonded to the steel pipe that is not coated with the polypropylene, the third layer comprising a second polymeric backing and a fourth layer comprising a second adhesive composition according to claim 1 on the second polymeric backing, said fourth layer comprising the second adhesive composition bonded to the first polymeric backing of the first layer and to the steel pipe that is not coated with the polypropylene.

11. The assembly according to claim 10 wherein the first adhesive composition is the adhesive composition comprising
    (a) An amount of from about 20 to about 60% by weight of a maleic anhydride-modified propylene-ethylene copolymer resin;
    (b) An amount of from about 15 to about 40% by weight of a maleic anhydride-modified polyethylene;
    (c) An amount of from about 5 to about 20% by weight of a polyisobutylene;
    (d) An amount of from about 5 to about 20% by weight of a terpolymer comprising ethylene, propylene and a non-conjugated diene; and
    (e) An amount of from about 10 to about 30% by weight of an inert thermoplastic hydrocarbon resin tackifier formulated from a mixture of aromatic and aliphatic feedstocks,
wherein
the maleic anhydride-modified propylene-ethylene copolymer resin has a melt index of 4.5 g/10 min., a density of 0.9 g/cm$^3$, and a melt point of 143° C.; and wherein the maleic anhydride-modified polyethylene has a melt index of 3.1 g/10 min., a density of 0.92 g/cm$^3$, a melt point of 126° C., and a Vicat Softening Point of 87° C., and wherein the adhesive composition further comprises pentaerythritol tetrakis [3-(3,5-di-tert-butyl-4-hydroxyphenyl) propionate], and a color concentrate comprising an ethylene-ethyl acrylate copolymer having 18.5 to 20 weight % ethyl acrylate and carbon black, and wherein the second adhesive composition is the adhesive composition comprising
    (a) An amount of from about 20 to about 60% by weight of a maleic anhydride-modified propylene-ethylene copolymer resin;
    (b) An amount of from about 15 to about 40% by weight of a maleic anhydride-modified polyethylene;
    (c) An amount of from about 5 to about 20% by weight of a polyisobutylene;
    (d) An amount of from about 5 to about 20% by weight of a terpolymer comprising ethylene, propylene and a non-conjugated diene; and
    (e) An amount of from about 10 to about 30% by weight of an inert thermoplastic hydrocarbon resin tackifier formulated from a mixture of aromatic and aliphatic feedstocks,
wherein
the maleic anhydride-modified propylene-ethylene copolymer resin has a melt index of 4.5 g/10 min., a density of 0.9 g/cm$^3$, and a melt point of 143° C.; and wherein the maleic anhydride-modified polyethylene has a melt index of 3.1 g/10 min., a density of 0.92 g/cm$^3$, a melt point of 126° C., and a Vicat Softening Point of 87° C., and wherein the adhesive composition further comprises pentaerythritol tetrakis [3-(3,5-di-tert-butyl-4-hydroxyphenyl) propionate], and a color concentrate comprising an ethylene-ethyl acrylate copolymer having 18.5 to 20 weight % ethyl acrylate and carbon black.

12. The assembly according to claim 10 wherein the first layer comprises a first polymeric backing having a thickness of about 15 mils and an adhesive layer there on having a thickness of about 30 mils; and wherein the third layer comprises a second polymeric backing having a thickness of about 30 mils and an adhesive layer thereon having a thickness of about 40 mils.

13. The assembly according to claim 10 wherein the first layer is in a form of strips.

14. An assembly comprising:
   (a) a substrate that is a steel pipe partially coated with a polypropylene;
   (b) at least one first layer bonded to the polypropylene coating of the polypropylene-coated steel pipe and to the steel pipe that is not coated with the polypropylene, said first layer comprising a first polymeric backing and a second layer thereon comprising the adhesive composition according to claim 1, said second layer comprising the adhesive composition bonded to the polypropylene coating and to the steel pipe that is not coated with the polypropylene; and
   (c) at least one third layer bonded to the first polymeric backing of the first layer, the third layer comprising a second polymeric backing and a fourth layer comprising a hot melt adhesive on the second polymeric backing, said fourth layer comprising the hot melt adhesive bonded to the first polymeric backing of the first layer.

15. The assembly according to claim 14 wherein the first layer comprises a first polymeric backing having a thickness or about 15 mils and an adhesive layer thereon having a thickness of about 20 mils; and wherein the third layer comprises a second polymeric backing having a thickness of about 30 mils and an adhesive layer thereon having a thickness of about 20 mils.

* * * * *